Sept. 4, 1956    G. F. WALD ET AL    2,761,986
IMPULSE-GENERATING DEVICE FOR MEASURING TRAVELING MATERIAL
Filed March 25, 1953    2 Sheets-Sheet 1
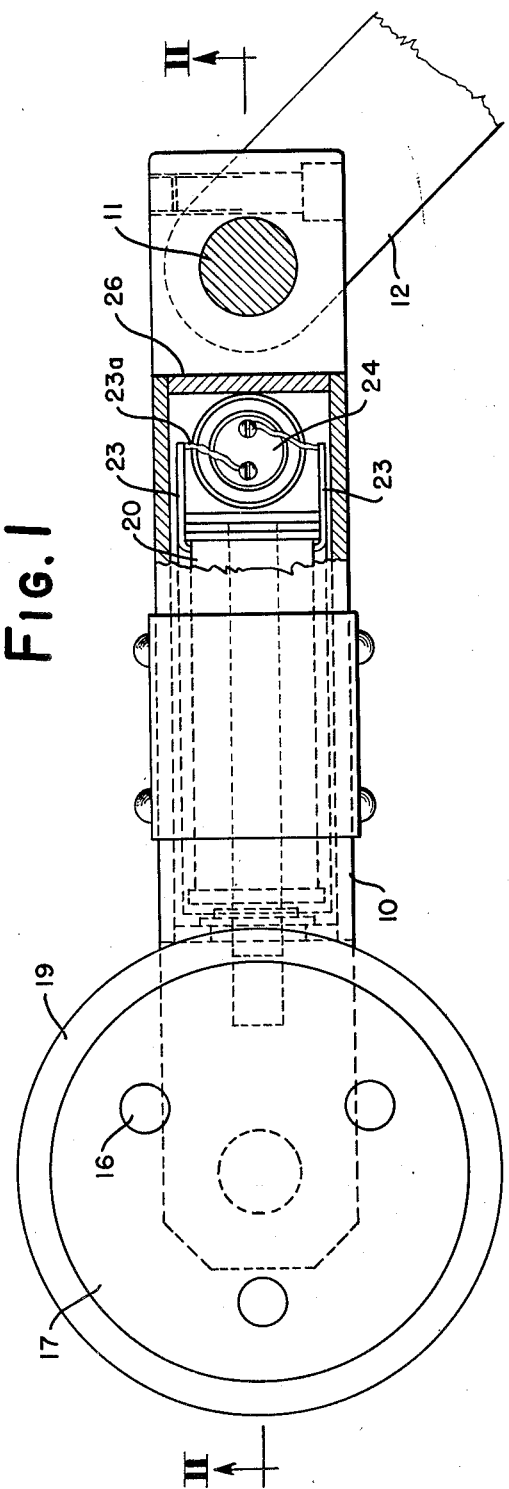
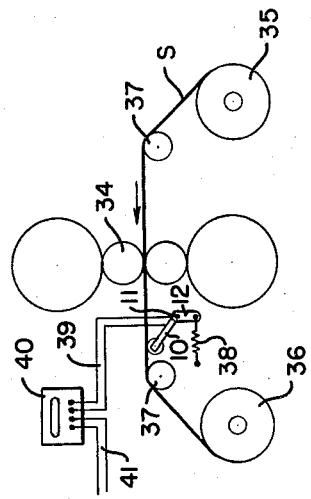
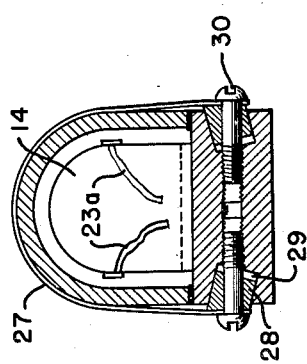
INVENTORS
GEORGE F. WALD AND
CARL T. ZIMMERMANN
BY
Donald G. Dalton
THEIR ATTORNEY

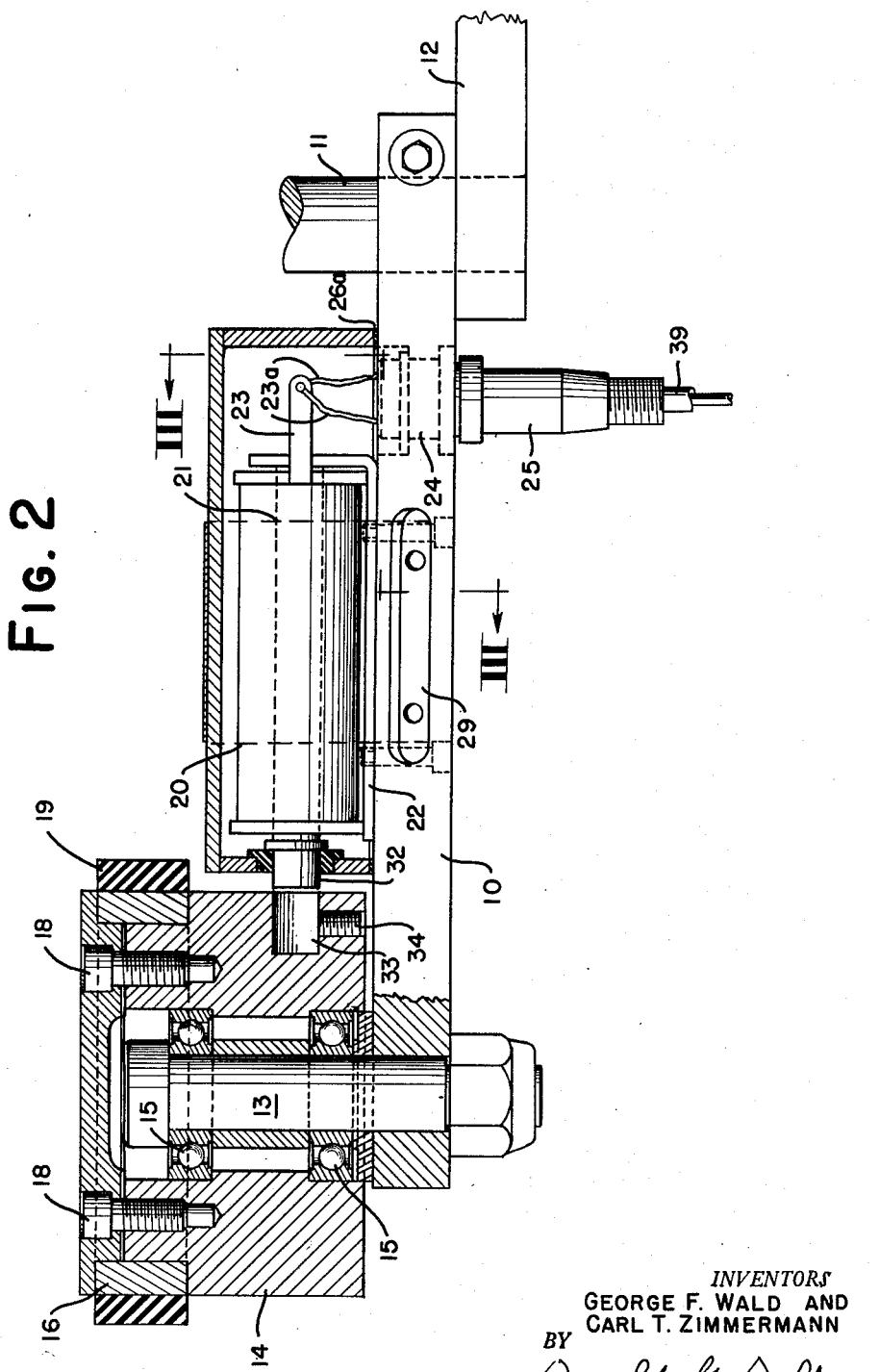

United States Patent Office

2,761,986
Patented Sept. 4, 1956

2,761,986

IMPULSE-GENERATING DEVICE FOR MEASURING TRAVELING MATERIAL

George F. Wald, North Olmsted, and Carl T. Zimmermann, Cleveland Heights, Ohio, assignors to United States Steel Corporation, a corporation of New Jersey Application March 25, 1953, Serial No. 344,649

10 Claims. (Cl. 310—156)

This invention relates to a device for producing electrical impulses proportional in number to the length of a moving piece of material, whereby the total length thereof may be derived by counting the impulses.

Production-measurement apparatus responsive to a succession of electrical impulses has been developed for indicating and recording the output of mills or other processing equipment, the product of which issues in single pieces of great length such as metal strip. It is the general object of our invention to provide an improved impulse-generating device for operating such apparatus. More particular objects of our invention are to provide an impulse-generating device which utilizes the principle of electro-magnetic induction and has its electrical parts fully enclosed and protected against contact with oil, water and dirt normally encountered in the neighborhood of rolling mills, for example.

In a preferred embodiment, our device comprises a lever pivotally mounted adjacent the path of the moving material, having a roller thereon adapted to be driven by frictional contact therewith. An induction coil is mounted on the lever and a permanent magnet is carried by the roller for cooperation with the coil whereby the coil is excited and generates a voltage impulse at each passage of the magnet. The impulses are relayed to any suitable form of recorder responsive thereto.

A complete understanding of the invention may be obtained from the following detailed description and explanation which refer to the accompanying drawings illustrating the present preferred embodiment. In the drawings, Figure 1 is a side elevation of our device with a part broken away;

Figure 2 is a longitudinal section therethrough taken along the plane of line II—II of Figure 1 with parts in elevation;

Figure 3 is a transverse section taken along the plane of line III—III of Figure 2, with parts omitted; and Figure 4 is a diagrammatic side elevation of a cold strip mill showing the application of the invention thereto.

Referring now in detail to the drawings and, for the present, to Figures 1 through 3, a lever 10 is secured to a shaft 11 journaled in any suitable bearings (not shown). An actuating arm 12 is also secured to the shaft for a purpose which will appear later. At its end remote from shaft 11, lever 10 is fitted with a stub shaft 13 normal thereto. A cylindrical roller 14 is journaled on shaft 13 by means of anti-friction bearings 15 spaced therealong. Roller 14 is turned down at one end to afford a seating shoulder for a ring 16 removably disposed thereon. The ring is secured on the roller by a clamping disc 17 and cap screws 18. The ring is provided with a tire 19 of resilient material resistant to wear, such as rubber, nylon or the like.

An induction coil 20 having a core 21 extending therethrough, is disposed longitudinally of lever 10 and has its base 22 secured thereto. The terminals 23 of the coil are connected by short leads 23a to a receptacle 24 adapted to receive a two-prong plug 25. A box-like cover 26 of non-magnetic material such as stainless steel, encloses the coil. The cover is removably held in place by a flexible metal strap 27 having anchor blocks 28 at the ends thereof. The edges of lever 10 are recessed at 29 to accommodate the blocks which are removably held therein by screws 30. A sealing gasket 26a is disposed between the edge of the cover and lever 10. The end wall of cover 26 adjacent roller 14 has an opening therein coaxial with coil 20 and a bushing 31 of insulating material is seated in the opening. A plug 32 of soft iron is fitted tightly in the bushing. The inner end of the plug abuts the end of the core and constitutes an extension thereof.

Roller 14 has a recess in its periphery, located in a plane alined with plug 32, adapted to accommodate a permanent bar magnet 33. The magnet is removably secured in place by a set-screw 34. By reason of the relation of the parts described thus far, the movement of magnet 33 past plug 32 on rotation of roller 14 causes a transient voltage to be induced in coil 20, the magnitude of which depends on the number of flux linkages between the magnet and coil and the rate at which they are cut.

Figure 4 shows how our invention may be applied to the measurement of the length of strip S issuing from a cold-rolling mill 35. As there shown, the strip is unwound from a coil on a pay-out reel 35, passes through the mill and is re-wound on a coiler 36. In its pass through the mill, the strip traverses guide rollers 37. The shaft 11 of our impulse-generating device is mounted adjacent the strip path on the exit side of the mill. A tension spring 38 connected to arm 12 constantly urges lever 10 in the clockwise direction so as to bring the surface of tire 19 into frictional contact with the strip. Thus roller 14 is driven by this frictional contact as the strip issues from the mill.

Coil 20 is connected by a two-conductor flexible cable 40 to a measuring apparatus 41 of any suitable type, e. g., a register, responsive to a succession of electrical impulses. This apparatus is connected to an appropriate power supply by conductors 42 and furnishes a visible indication or printed or punched-card record of the length of strip delivered from the mill, each revolution of the roller causing an impulse which increases the reading shown or recorded. To facilitate calibration, the tire 19 may be dimensioned to have a circumference of exactly unit length such as one foot.

It will be evident from the foregoing that our invention provides a simple impulse generator positively actuated in exact accordance with the length of material delivered by the mill. The cover 26 tightly sealed to the lever 10 effectively protects the coil 20 from contact with oil, water or dirt. At the same time, the cover may be easily removed when it is desired to inspect or replace the coil. In so doing, the plug 32 remains with the cover and is thus restored to proper relation with the core 21 and magnet 33 on replacement of the cover. The plug, of course, greatly reduces the reluctance of the magnetic circuit through the core by bridging all but a small portion of the air gap between it and the magnet. In other words, the provision of the plug makes it feasible to enclose the coil completely without objectionably reducing the flux linkages between the coil and the magnet as it travels past the end of the core. As a result, a strong voltage impulse is obtained even when the strip is traveling at relatively low speed, as when starting or finishing a coil.

Although we have disclosed herein the preferred embodiment of our invention, we intend to cover as well any change or modification therein which may be made without departing from the spirit and scope of the invention.

We claim:

1. Apparatus for measuring the length of traveling material by electrical impulses comprising a lever pivotally mounted adjacent to the path of the material, an elongated induction coil mounted on said lever, a core of magnetic material in said coil, a roller journaled on said lever, said roller being adapted to make frictional contact with said material and be driven thereby, and a permanent magnet mounted on said roller in line with said core so as to sweep past one end of the core on each revolution of the roller.

2. Apparatus as defined by claim 1 characterized by said lever being pivoted on an axis transverse to said path.

3. Apparatus as defined by claim 1 characterized by means constantly urging said lever in a direction such as to bring the roller into contact with the material.

4. Apparatus as defined by claim 1 characterized by said roller having a radial recess in its periphery and said magnet being removably secured in said recess.

5. Apparatus as defined by claim 1 characterized by a box-like cover enclosing said coil, said cover having an opening in the end adjacent said roller alined with the coil and a magnetic plug seated in said opening and extending from the adjacent end of the coil toward said roller.

6. Apparatus as defined by claim 1 characterized by said roller having a coaxial ring removably secured thereon, said ring having thereon a resilient tire adapted to engage said material.

7. A device as defined by claim 6 characterized by a clamping disc secured to the roller and engaging said rim.

8. Apparatus as defined by claim 1 characterized by a cover enclosing said coil and a strap encircling said cover and secured to said lever, removably holding the cover in place.

9. A device as defined by claim 8 characterized by said strap having anchor blocks at its ends and said lever having recesses adapted to receive said blocks, respectively.

10. Apparatus as defined by claim 1 characterized by a shaft extending normal to said lever adjacent the free end thereof and anti-friction bearings spaced along said shaft, said roller being mounted on said bearings.

UNITED STATES PATENTS

References Cited in the file of this patent

| | | |
|---|---|---|
| Re. 20,526 | Motycka | Oct. 5, 1937 |
| 2,087,335 | Seeley | July 20, 1937 |
| 2,579,344 | Sais | Dec. 18, 1951 |

FOREIGN PATENTS

| | | |
|---|---|---|
| 535,371 | Great Britain | Apr. 8, 1941 |
| 556,597 | Great Britain | Oct. 12, 1943 |
| 971,931 | France | Aug. 23, 1950 |